United States Patent Office 3,329,340
Patented July 4, 1967

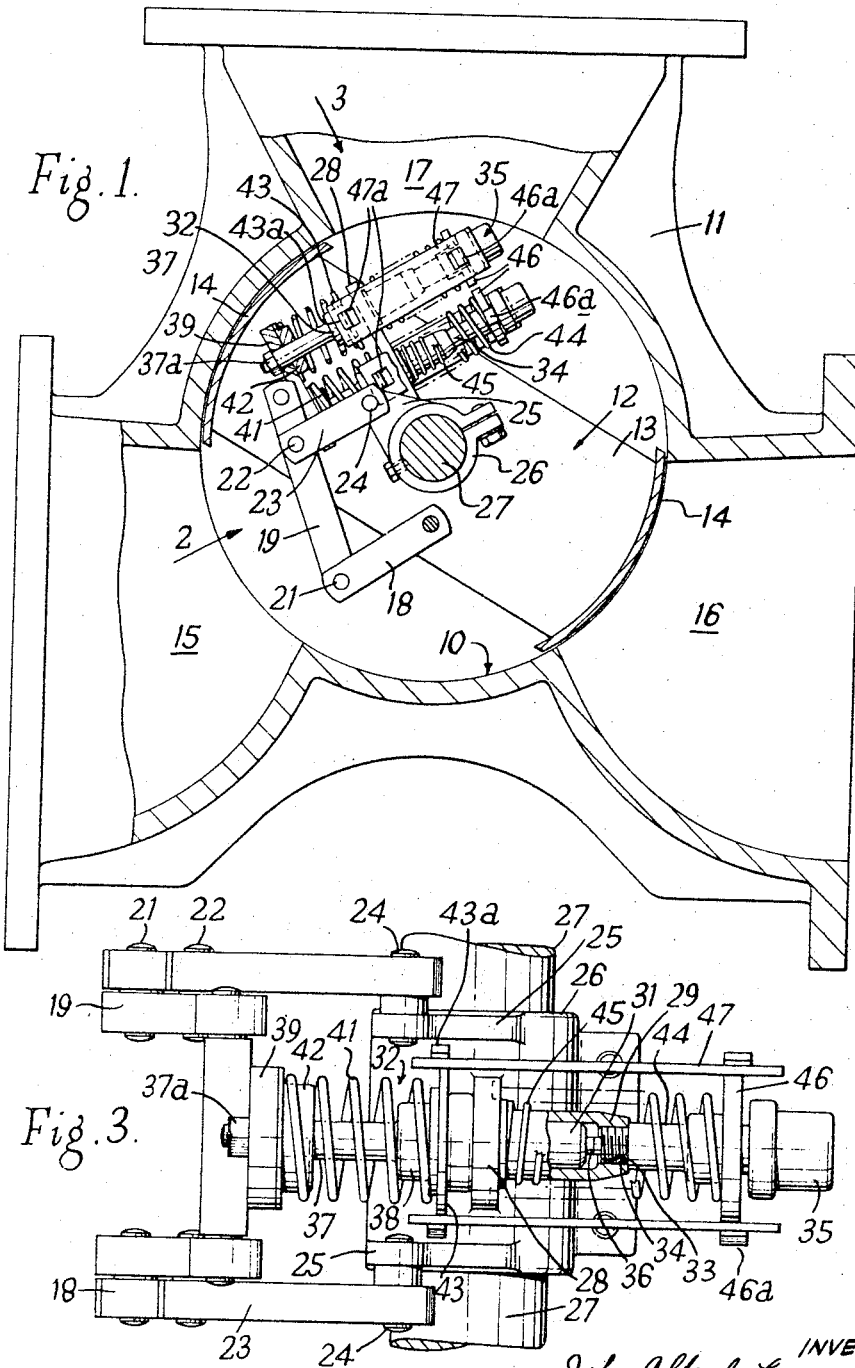

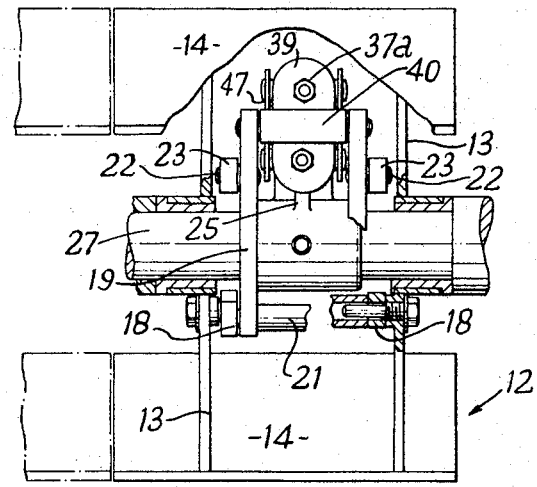
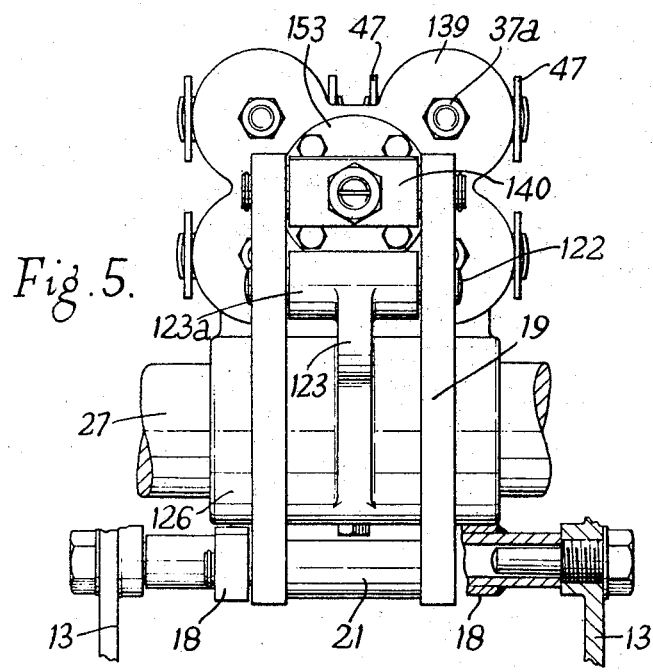

3,329,340
THERMOSTATICALLY CONTROLLED VALVES
John Alfred Lipscombe, Ashford, near Staines, England, assignor to Walton Engineering Company Limited, London, England
Filed June 22, 1965, Ser. No. 465,870
Claims priority, application Great Britain, June 22, 1964, 25,797/64
11 Claims. (Cl. 236—34.5)

The present invention relates to thermostatically controlled valves.

The invention is concerned with thermostatically controlled valves of the rotary type, in which a rotor, which is mounted on a valve spindle and which carries a pair of arcuate shutters to control the effective aperture of a pair of arcuate ports in the cylindrical wall of a valve body housing, is angularly adjusted by a thermostat element of the wax-filled type. Such a valve is hereinafter called "a valve of the type referred to." An example of this type of valve is described in British patent specification No. 845,243.

The size of known wax-filled thermostat elements is limited by the practicable size of the wax charge. If the wax charge were increased appreciably beyond the size at present used, the response of the thermostat would be too slow for safety. Thermostat valves of the type referred to are mainly used for controlling the temperature of the cooling water or engine lubricant for an internal combustion engine. This may be effected either by dividing the liquid issuing from the engine between a cooler and a bypass prior to recirculation or alternatively by mixing liquid returning to the engine from a cooler and a bypass. If there is a time lag in the response of the thermostat element then the engine may be damaged either by overheating or overcooling. This is particularly the case with large size engines, such as a ship's diesel engines.

In practice therefore the plunger travel and the force produced by a wax-filled thermostat is limited. Whilst the valve described in the said patent specification has produced excellent results, it is limited in practice to a size of about 6 inches, i.e. this is the maximum size of pipe to which it can be fitted, assuming the pipe is to be operated at full flow capacity.

However a much larger size of valve is required for controlling coolant temperature of a ship's diesel engine of, say, 20,000–30,000 H.P. and the temperature response of such valve must be rapid to prevent damage in the event of sudden shut-down from full speed.

It is an object of the present invention to provide a thermostatically controlled valve of the type referred to, in which the force required for turning the rotor is solely provided by wax-filled thermostat elements.

Since the side thrust on the rotor at full flow conditions is large, the diameter of the rotor spindle must be increased to withstand it as the size of the valve is increased. A rotary valve of fourteen inch size requires a spindle of about two inches diameter, so that the angular movement which can be produced by a conventional wax-filled thermostat element is insufficient. However, at the same time the space within the valve bore, within which the thermostat elements may be fitted, has increased.

According to the present invention there is provided a valve of the type referred to in which the rotor is controlled by at least one bank of thermostat elements, containing four thermostat elements arranged in pairs, side-by-side and held in a holder secured to the valve spindle, the barrel of one thermostat element of each pair being guided in a guideway in the holder and its plunger opposed to the plunger of the other thermostat element, the barrel of which is secured in the holder in alignment with the first thermostat element, thrust being transmitted from the first thermostat element of each pair through an articulating connection to a thrust plate, pivotally connected to one end of a lever, the other end of which is pivotally linked to the rotor, said lever being connected to a swinging fulcrum, mounted on the spindle, at a point nearer to the thrust plate pivot than to the rotor link pivot so as to multiply the thermostat travel. Where two banks of thermostat elements are employed it is necessary for the thrust plate to be able to pivot in relation to the lever in two planes at right angles.

It will be appreciated that with this construction the rotor will always respond to temperature change, even if one of the thermostat elements has failed and indeed will move to some extent up to three element failures. However, wax-filled thermostat elements are very reliable components and the failure of even one element is extremely unlikely.

With valves of 12 inches and 14 inches size, this arrangement of thermostat elements would probably be used to operate a plurality of separate and independent rotor sections, probably two or three, arranged in the manner described in British Patent No. 949,064.

An embodiment of the present invention will now be described with reference to the accompanying drawings, in which:

FIGURE 1 is a side view, partially in a section, of a valve of the invention,

FIGURE 2 is a detail view in the direction of arrow 2 of FIGURE 1,

FIGURE 3 is a detail view on an enlarged scale in in the direction of arrow 3 of FIGURE 1, FIGURE 5 is a view in the direction of arrow 5 of FIGURE 4.

Figure 4:
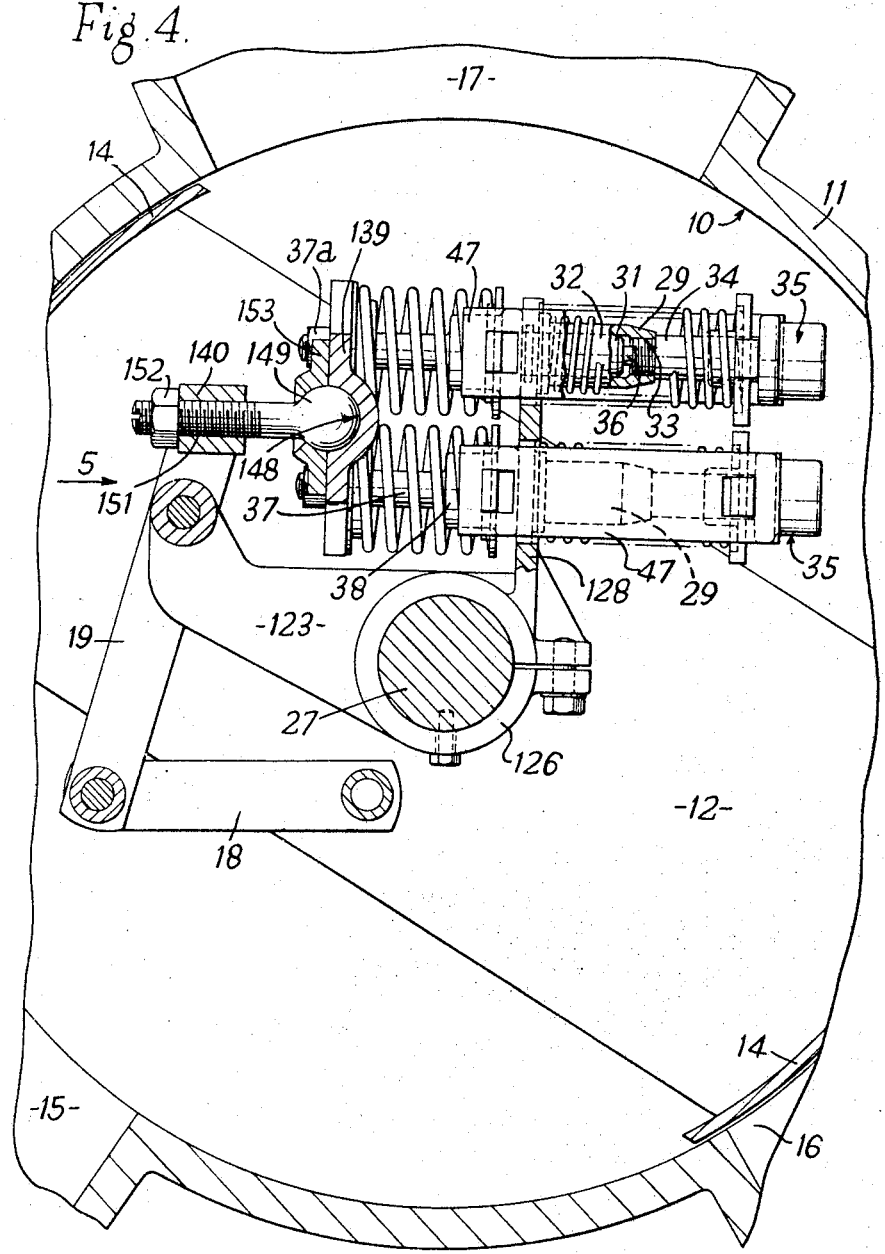
FIGURE 4 is a view similar to FIGURE 1 on an enlarged scale of a modified valve of the invention.

Referring now to FIGURES 1 and 2, a valve of the invention comprises a valve casing 11 containing a rotor 12 having diametrally extending webs 13 carrying a pair of arcuate shutters 14 for controlling the effective apertures of two (15 and 16) of the three arcuate ports 15, 16 and 17 formed in the cylindrical wall 10 of the valve body housing or casing 11. The rotor 12 is linked by a pair of pivoted links 18 to a pair of movement multiplying levers 19 about a pivot 21. The levers 19 are pivoted intermediate their ends at 22 to a pair of swinging fulcrum links 23, which are pivoted at 24 to anchor members 25, that are carried on a collar 26 surrounding and secured to the valve spindle 27.

A thermostat holder 28 is fixed to the collar 26 immediately adjacent the anchor members 25. The holder 28 has two parallel tubuular extensions 29 attached thereto. Within these extensions 29 are slidably received the barrels 31 of two wax-filled thermostat elements 32, which are standard commercial wax-filled thermostat elements (see FIGURE 3 which shows these parts in more detail). The extensions 29 are internally screw-threaded at 33 and have engaged therein the screw-threads formed on the ends of the barrels 34 of further thermostat elements 35 respectively. The plungers 36 of the elements 32 and 35 in the same extension 29 are butted against one another.

A bolt 37 is formed as an extension of the head 38 of each element 32 and is movable with the movable part of the elements 32. Both bolts 37 slidably pass through a thrust plate 39 and are located thereon by nuts 37a at the free ends. The openings through which the bolts pass are of rounded venturi shape so that there is an articulating connection between the bolts 37 and thrust plate 39. The thrust plate 39 is attached to a cross link 40 pivotally mounted between the ends of levers 19 to pivot about an axis parallel to the spindle 27.

A heavy compression spring 41 surrounds each bolt 37 abutting at its ends against collars 42 and 43. At one end of spring 41 the collar 42 rests on the thrust plate 39 and at the other end against collar 42 which is held between parts of head 38. These springs 41 are over-ride springs provided to prevent damage to the thermostat elements 32 and 35 in the event that the rotor 12 is prevented from rotating by, for example, jamming.

A pair of coaxial springs 44 and 45 is associated with each element pair to return the rotor 12 to a position of rest when the wax-filled elements contract. These springs 44 and 45 surround the extensions 29 and bear at one end against the holder 28 and at the other end against a collar 46 which surrounds the barrel 34. Movable head 38a of thermostat element 35 bears on collar 46. The collars 46 and 43 are connected together by connecting plates 47, the collars 46 and 43 having ears 46a and 43a to engage in openings 47a in the connecting plates 47.

In one use the port 17 is connected to engine water outlet, port 16 to a water cooler and port 15 to a line bypassing the cooler. When the water passing through the casing 11 becomes hot enough to melt the wax in the elements 32 and 35, these are caused to expand. This results in the heads 38 being moved away from the holder 28 against the influence of the springs 44 and 45. This movement is transmitted via springs 41 to the plate 39 and thence via the multiplying levers 19 and links 18 to rotate the rotor 12 to close port 15 and open port 16. On cooling and contraction of the elements 32 and 35 springs 44 and 45 return the heads 38 and with them the rotor 12 via the bolts 37, plate 39, levers 19 and links 18.

By pivotally mounting the plate 39, the latter can compensate for slight variations in the expansion or contraction of the thermostat elements 32 and 35. Further it will be seen that the construction will continue to operate even if one or more of the thermostat elements fail.

When a valve of this type is utilised in the cooling system of a marine diesel, it is normally only in tropical waters that the whole of the coolant water is passed to the cooler and therefore it is normally only in tropical waters that the failure of a thermostat element can cause appreciable overheating. To guard against this risk, the normally stationary spindle 27 may have a radially extending manually operable handle (not shown) whereby it may be manually adjusted to turn the rotor so as to uncover fully the port 16 leading to the cooler.

The ports 15, 16 and 17 in the housing may be such that their axial length (i.e. their dimensions in the direction of the axis of the spindle 27) is greater than a single rotor can cope with. In these circumstances the rotor may be in two identical sections mounted side-by-side on the spindle 27 and each having its own bank of thermostats and associated linkage.

When the rotor is of an exceptionally large diameter—say about 20 inches—each bank of four valve elements may be supplemented by an additional bank of elements. Such an arrangement is shown in FIGURES 4 and 5 to which reference is now made. This arrangement again comprises a rotor 12 having webs 13 and shutters 14 for ports 15, 16 and 17 in the housing 11 of the valve. The webs 13 are connected via a pair of links 18 to a pair of multiplying links 19 that are connected at their other ends to a cross link 140. The links 19 are pivoted on a spindle 122 carried by a transverse boss 123a on an arm 123 that is integral with the collar 126 which is mounted on spindle 27 which carries the thermostat holder 128. The thermostat holder 128 has four projections 29 each containing the barrel 31 of a thermostat element 32 and screw threadedly connected to the barrel 34 of a second thermostat element 35 so that the plungers 36 of the two elements 32 and 35 abut or are connected to each other. The thermostat holder 128 also is provided with an aperture between each pair of projections 29 to receive the inner pair of connecting plates 47, the outer connecting plates lying outside the holder 128. The head 38 of each element 32 has a bolt 37 which passes through a thrust plate 139 and is connected thereto by a nut 37a. The thrust plate 139 has a hemispherical seating 148 for the ball end 149 of a bolt 151 threadedly carried by the cross link 140 and having a locking nut 152 at its free end. An annular locking plate 153 bolted to the thrust plate 139 is shaped to complete the socket housing for the ball 149 to retain the latter in position. This ball and socket joint is required to compensate for slight variations in the expansion or contraction of the thermostat elements or if one or more thermostat elements fail.

It will be appreciated that the rotor of this embodiment may, similarly to the first described embodiment, be formed in a plurality of sections.

The invention is not limited to the precise constructional details hereinbefore described. For example, the bolts 37 need not be formed integrally on the heads 38 of the elements 32. Each bolt may instead be formed centrally on a top-hat shaped member that receives and cups the head 38. The flange of the top-hat shaped member serves the same purpose as the collar 43 and is provided with ears serving the same purpose as ears 43a. Further, the valves may be connected in the lubricating oil circuit of an engine, being located preferably at the lubricating oil inlet. The ports 16 and 15 will be connected respectively to a cooler and a line direct from the oil reservoir bypassing the cooler.

I claim:

1. A thermostatic controlled valve of the rotary type, comprising a valve body having a cylindrical wall and a main port and at least two arcuate ports in said cylindrical wall, a valve spindle carried by said valve body and extending axially through said valve body, a rotor rotatably mounted on the valve spindle and having a number of arcuate shutters corresponding to the number of arcuate ports mounted thereon for controlling the effective aperture of the arcuate ports in the cylindrical wall of the valve, a bank of a plurality of pairs of thermostatic elements of the wax-filled type arranged side-by-side with the plungers of the elements in each pair abutting each other, an element holder secured to the spindle with one element of each pair mounted thereon, a thrust plate connected to the other element of each pair of elements, and a multiplying linkage operatively connecting the said thrust plate to the rotor so as to multiply the movement of the thermostatic elements for adjusting the rotational position of the rotor.

2. A valve as claimed in claim 1 in which an articulating connection is provided between said other element of each pair and said thrust plate.

3. A valve as claimed in claim 1 characterised in that the thermostatic means comprises a plurality of banks of thermostatic elements and in that the thrust plate is connected to the linkage through a universal joint.

4. A valve as claimed in claim 3 wherein the universal joint is a ball and socket joint.

5. A valve as claimed in claim 1 characterised in that a spring means is connected between the said other element of each pair of elements and to the thrust plate to protect the elements of said pair should the rotor jam.

6. A valve as claimed in claim 1 characterised in that the holder comprises for each pair of thermostatic elements a tubular member connected to the said one element of each pair and slidably receiving the said other element of each pair.

7. A valve as claimed in claim 1 characterised in that the rotor comprises a plurality of rotor sections each movable by thermostatic means as aforesaid.

8. A valve as claimed in claim 1 characterised in that a further spring means engages the movable element of each pair of thermostatic elements and said movable element is movable against the bias of said further spring means.

9. A valve as claimed in claim 8 characterised in that the further spring means extends between the holder and a member movable with the movable element.

10. A valve as claimed in claim 1 characterised in that the linkage comprises a multiplying lever pivoted intermediate its ends having one end pivotally connected to the rotor and the other end connected to the thrust plate.

11. A valve as claimed in claim 10 in which a swinging pivot is provided on which the multiplying linkage is pivotable.

References Cited

UNITED STATES PATENTS

| | | | |
|---|---|---|---|
| 2,606,717 | 8/1952 | Barker | 236—12 |
| 2,810,523 | 10/1957 | Branson | 236—12 |
| 3,018,054 | 1/1962 | Simpson | 236—34.5 |
| 3,088,672 | 5/1963 | Simpson | 236—12 |
| 3,123,297 | 3/1964 | Lipscombe | 236—34.5 |

EDWARD J. MICHAEL, *Primary Examiner.*

EDWARD J. MICHAEL, *Examiner.*